(12) United States Patent
Ting (10) Patent No.: US 9,971,307 B1
(45) Date of Patent: May 15, 2018

(54) ELECTRONIC WATCH WITH FUNCTION OF CALLING FOR HELP

(71) Applicant: Primax Electronics Ltd., Taipei (TW)

(72) Inventor: Kuan-Pao Ting, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days. days.

(21) Appl. No.: 15/701,963

(22) Filed: Sep. 12, 2017

(30) Foreign Application Priority Data

Apr. 14, 2017 (TW) .............................. 106112591 A (51) Int. Cl.
| | |
|---|---|
| *G08B 1/08* | (2006.01) |
| *G04B 47/00* | (2006.01) |
| *G08B 25/10* | (2006.01) |
| *G04B 19/30* | (2006.01) |
| *G04C 10/02* | (2006.01) |
| *G01S 19/42* | (2010.01) |
| *G06K 9/00* | (2006.01) |

(52) U.S. Cl.
CPC .............. *G04B 47/00* (2013.01); *G08B 25/10* (2013.01); *G01S 19/42* (2013.01); *G04B 19/30* (2013.01); *G04C 10/02* (2013.01); *G06K 9/0004* (2013.01)

(58) Field of Classification Search
CPC ........ G04B 47/00; G04B 19/30; G08B 25/10; G01S 19/42; G04C 10/02; G06K 9/0004
See application file for complete search history.

(56) References Cited

U.S. PATENT DOCUMENTS

| | | | | |
|---|---|---|---|---|
| 9,159,223 | B2* | 10/2015 | Proud ..................... | H02J 7/025 |
| 9,888,885 | B2* | 2/2018 | An ......................... | H04W 76/50 |
| 2008/0097221 | A1* | 4/2008 | Florian .............. | A61B 5/02433 600/476 |
| 2010/0214057 | A1* | 8/2010 | Alvord .................... | G06F 21/32 340/5.2 |
| 2015/0046996 | A1* | 2/2015 | Slaby ..................... | H04L 63/08 726/7 |
| 2015/0111558 | A1* | 4/2015 | Yang ...................... | G04G 21/04 455/418 |
| 2015/0186636 | A1* | 7/2015 | Tharappel ............... | G06F 21/32 726/8 |
| 2015/0302086 | A1* | 10/2015 | Roberts ............ | G06F 17/30743 707/771 |

(Continued)

Primary Examiner — Joseph Feild
Assistant Examiner — Rufus Point
(74) Attorney, Agent, or Firm — Kirton McConkie; Evan R. Witt (57) ABSTRACT

An electronic watch with a function of calling for help is provided. The electronic watch includes a main body, a control module, a time display module, a transparent cover, an identifying module and a positioning module. The main body includes a displaying surface. The control module is disposed within the main body. The time display module is installed on the displaying surface and electrically connected with the control module. The transparent cover is aligned with the time display module to cover the displaying surface and connected with the main body. The identifying module is connected with the displaying surface and electrically connected with the control module. The positioning module is disposed within the main body and electrically connected with the control module. Consequently, the efficacy of calling for help and accurately rescuing the user is enhanced.

25 Claims, 5 Drawing Sheets

(56) References Cited

U.S. PATENT DOCUMENTS

| | | | | |
|---|---|---|---|---|
| 2015/0342542 | A1* | 12/2015 | An | A61B 5/747 |
| | | | | 455/404.2 |
| 2016/0021521 | A1* | 1/2016 | Lee | H04W 4/22 |
| | | | | 455/404.1 |
| 2016/0187857 | A1* | 6/2016 | Cho | G04R 20/00 |
| | | | | 368/47 |
| 2016/0241553 | A1* | 8/2016 | Kim | H04L 63/0861 |
| 2016/0349790 | A1* | 12/2016 | Connor | G06F 1/1694 |
| 2017/0017305 | A1* | 1/2017 | Hur | G06F 3/017 |
| 2017/0045918 | A1* | 2/2017 | Han | G06F 1/1684 |
| 2017/0048991 | A1* | 2/2017 | Kim | H01Q 1/273 |
| 2017/0115940 | A1* | 4/2017 | Byeon | G04G 21/02 |
| 2017/0124371 | A1* | 5/2017 | Vincent | G06K 9/0002 |
| 2017/0161016 | A1* | 6/2017 | McDunn | G06F 3/167 |
| 2017/0212479 | A1* | 7/2017 | Kwon | G04R 60/10 |
| 2017/0344155 | A1* | 11/2017 | Lee | G06F 3/044 |
| 2018/0032126 | A1* | 2/2018 | Liu | G06F 3/011 |
| 2018/0050661 | A1* | 2/2018 | Shim | B60K 35/00 |

\* cited by examiner

ELECTRONIC WATCH WITH FUNCTION OF CALLING FOR HELP

FIELD OF THE INVENTION

The present invention relates to an electronic watch with a function of calling for help.

BACKGROUND OF THE INVENTION

In the busy life, people like to do mountaineering activities, field survival activities or similar activities in holidays or vacations. Doing these activities helps the user relax the work pressure. In addition, the user also takes opportunity to be close to nature and enjoys the natural beauty through these activities. However, due to the weather and unpredictable natural changes, the climbers or field survivors are possibly killed. For solving these drawbacks, the climbers or wild survivors may wear mountain watches before departure.

Conventionally, a mountain watch comprises a main body, a compass and a wireless intercom module. The compass and the wireless intercom module are installed on the main body. In the event of an emergency condition, the user may roughly judge the current position according to the compass, and then use the wireless intercom module to select a channel of a radio station and call the radio station for help.

However, the conventional mountain watch still has some drawbacks. For example, after the radio station receives the distress signal from the user and reports this emergency case to the police or the emergency search and rescue center, the actual position of the user cannot be realized. Since the actual position of the user cannot be realized, the gold rescue time is usually delayed. Secondly, the police or the emergency search and rescue center cannot realize the identity of user in the emergency condition promptly.

SUMMARY OF THE INVENTION

The present invention provides an electronic watch with a function of calling for help.

In accordance with an aspect of the present invention, there is provided an electronic watch with a function of calling for help is provided. The electronic watch includes a main body, a control module, a time display module, a transparent cover, an identifying module and a positioning module. The main body includes a displaying surface. The control module is disposed within the main body. The time display module is installed on the displaying surface and electrically connected with the control module. The identifying module is connected with the displaying surface and located under the transparent cover. The identifying module is electrically connected with the control module. An identification data is stored in the identification module. The positioning module is electrically connected with the control module and is disposed within the main body. Moreover, the positioning module generates a position data. If a capture signal obtained by the identifying module complies with the identification data, a distress signal containing the identification data and a position data is generated by the control module. Consequently, the efficacy of calling for help and accurately rescuing the user is enhanced.

In an embodiment, the control module includes a control element and a communication element electrically connected with the control element. The time display module, the identifying module and the positioning module are electrically connected with the control element. After the identification data and the position data are converted into the distress signal by the control element, the distress signal is outputted through the communication element. Preferably, the control module further includes a circuit board. The control element, the communication element, the time display module, the identifying module and the positioning module are installed on the circuit board and electrically connected with the circuit board.

In an embodiment, the positioning module is a satellite positioning module, and the positioning module receives a satellite signal and generates the position data according to the satellite signal. Preferably, the identifying module includes a fingerprint capturing element and a control unit. The fingerprint capturing element is installed on the displaying surface. The control unit is installed on the circuit board and electrically connected with the circuit board. The fingerprint capturing element and the control element are electrically connected with the control unit. The capture signal is obtained by the fingerprint capturing element. Preferably, the identifying module further includes a storage element. The storage element is installed on the circuit board. The storage element is electrically connected with the control element and the circuit board. The identification data is stored in the storage element. Preferably, the fingerprint capturing element is an optical fingerprint sensor, and the storage element is a memory.

In an embodiment, the electronic watch further includes a wireless intercom module. The wireless intercom module is electrically connected with the circuit board. A speaking start key is formed on a lateral side of the main body. The speaking start key is electrically connected with the wireless intercom module. The wireless intercom module is disposed within the main body. The wireless intercom module receives and transmits an input audio signal. The wireless intercom module receives and outputs a return audio signal. Preferably, the wireless intercom module further includes a sound receiver and an audio transceiver which are electrically connected with the circuit board. The speaking start key is electrically connected with the sound receiver. The sound receiver is electrically connected with the audio transceiver. The input audio signal is received by the sound receiver and is outputted through the audio transceiver. The wireless intercom module further comprises a sound output element, and the sound output element is electrically connected with the audio transceiver and the circuit board. After the return audio signal is received by the audio transceiver, the return audio signal is outputted through the sound output element. Preferably, the main body further includes a mesh. The sound receiver and the sound output element are aligned with the mesh. Preferably, the wireless intercom module further includes a first audio processor and a second audio processor. The sound receiver is electrically connected with the audio transceiver through the first audio processor. The sound output element is electrically connected with the audio transceiver through the second audio processor. The input audio signal is transmitted to the audio transceiver through the first audio processor. The return audio signal is transmitted to the sound output element through the second audio processor. By using the wireless intercom module, the user can communicate with the emergency search and rescue center. Consequently, the emergency search and rescue center can realize the current situation of the user.

In an embodiment, the electronic watch further includes a power supply module. The power supply module includes a power providing element. The power providing element is installed on the circuit board. The power providing element is electrically connected with the circuit board, the control element, the identifying module, the positioning module, the wireless intercom module and the time display module. Preferably, the power supply module further includes a power generator. The power generator is electrically connected with the power providing element and disposed on the displaying surface of the main body. Preferably, the power generator is a solar panel.

In an embodiment, the time display module includes a display control unit, plural first display units and plural second display units. The display control unit is installed on the circuit board and electrically connected with the control element and the circuit board. The plural first display units and the plural second display units are electrically connected with the display control unit and installed on the displaying surface. Preferably, the plural first display units are disposed on the displaying surface in a circular permutation. The plural second display units are externally arranged around the plural first display units in a circular permutation. The plural first display units and the plural second display units are in a concentric arrangement. Preferably, the time display module further includes a time adjuster. The time adjuster is formed on a lateral side of the main body and electrically connected with the display control unit. Preferably, the time display module further includes a timing circuit. The timing circuit is installed on the circuit board. The timing circuit is electrically connected with the circuit board and the display control unit. The timing circuit generates a time signal. The time signal is shown through the first display units and the second display units under control of the display control unit.

In an embodiment, the time display module further includes a noctilucent light generator. The noctilucent light generator is installed on the displaying surface of the main body and electrically connected with the circuit board and the display control unit. Preferably, each of the plural first display units, the plural second display units and the noctilucent light generator includes a light emitting diode. The display control unit is a microcontroller. Preferably, each of the displaying surface and the plural second display units is coated with a reflective glue. Preferably, the electronic watch further includes a first reflective strip and a second reflective strip. The first reflective strip is disposed on the displaying surface of the main body. The second reflective strip is disposed on a bottom surface of the transparent cover. The first reflective strip and the second reflective strip face each other. Preferably, a mark is formed on the second reflective strip, which is disposed on the transparent cover. Preferably, the transparent cover is made of a glassy material. Consequently, even if the electronic watch is used in a dark environment or a dim environment, the electronic watch can be viewed by the user.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
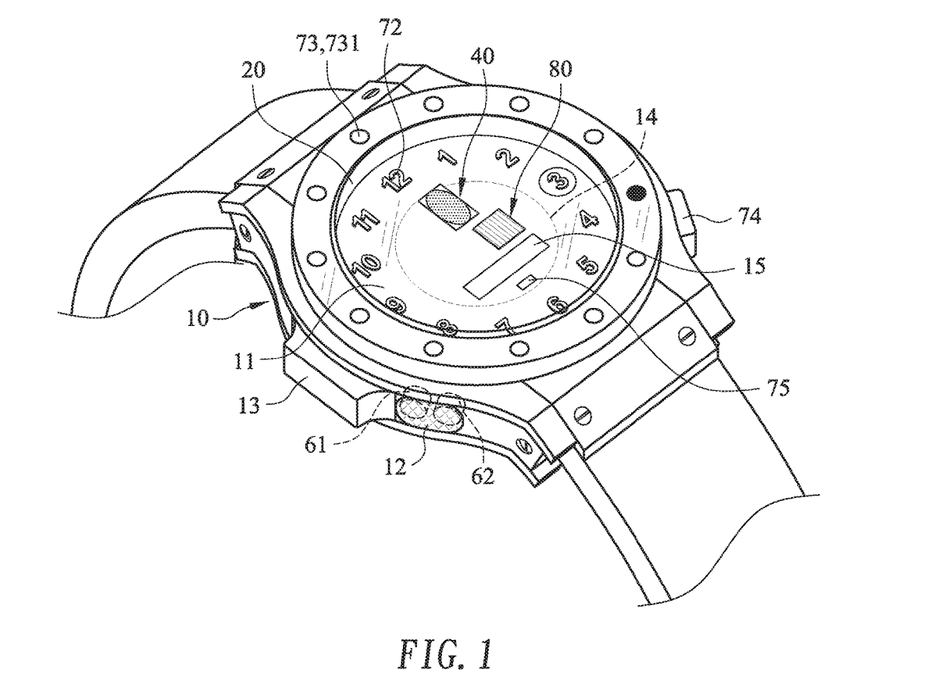
FIG. 1 is a schematic perspective view illustrating an electronic watch with a function of calling for help according to an embodiment of the present invention.
Figure 2:
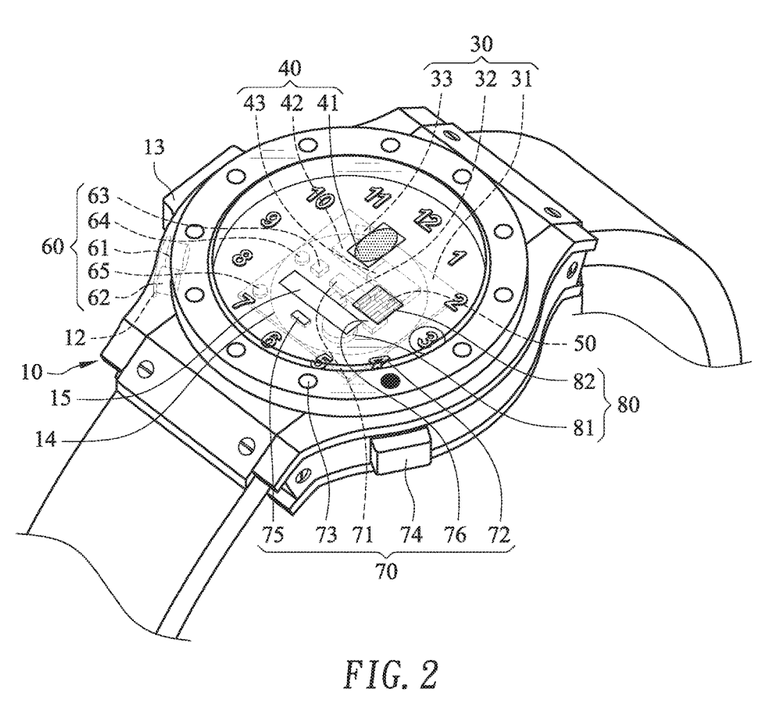
FIG. 2 is a schematic perspective view illustrating the electronic watch of FIG. 1 and taken along another viewpoint.
Figure 3:
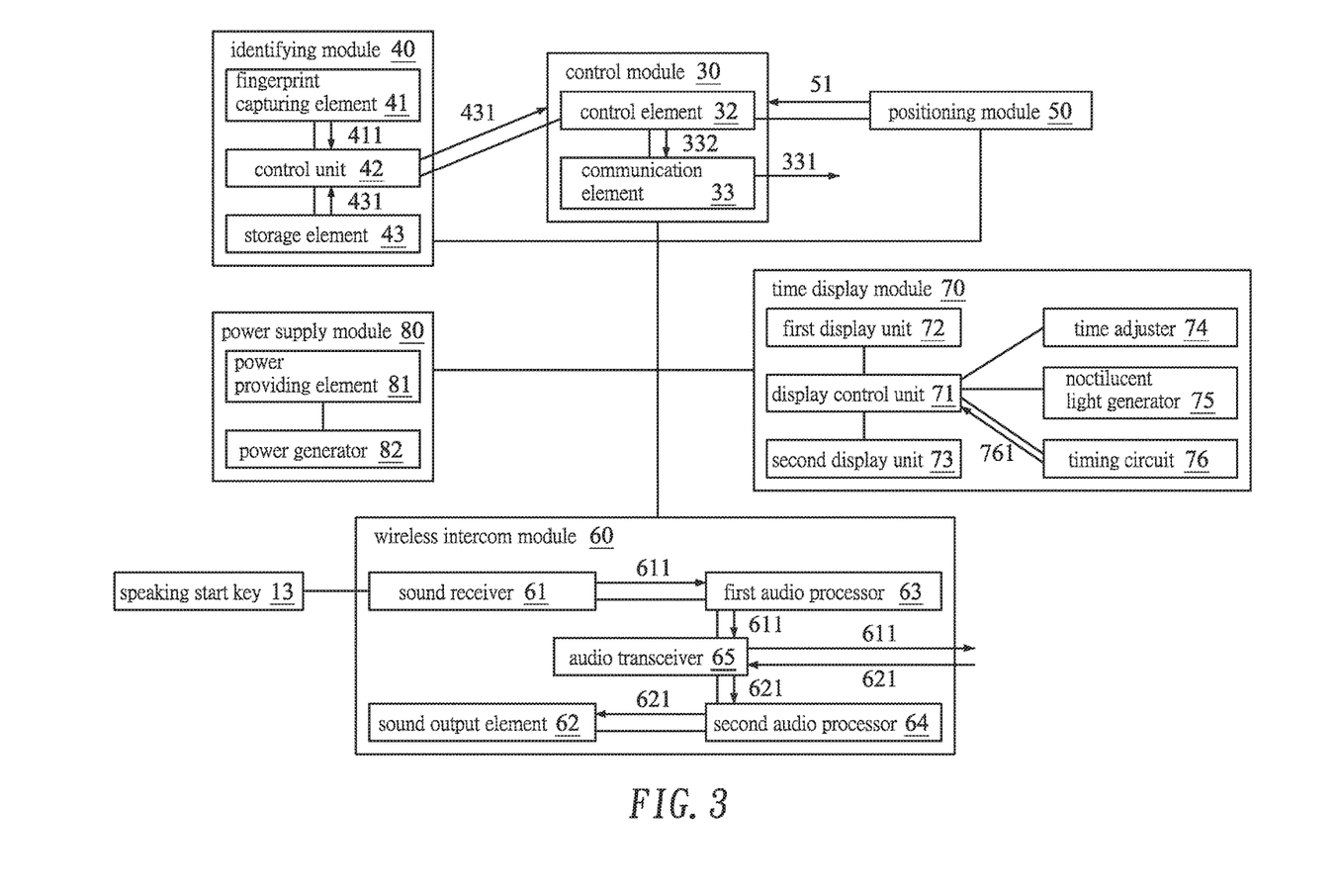
FIG. 3 is a schematic functional block diagram illustrating the architecture of the electronic watch according to the embodiment of the present invention.

FIG. 1 is a schematic perspective view illustrating an electronic watch with a function of calling for help according to an embodiment of the present invention. FIG. 2 is a schematic perspective view illustrating the electronic watch of FIG. 1 and taken along another viewpoint. FIG. 3 is a schematic functional block diagram illustrating the architecture of the electronic watch according to the embodiment of the present invention. As shown in FIGS. 1, 2 and 3, the electronic watch 100 comprises a main body 10, a transparent cover 20, a control module 30, an identifying module 40, a positioning module 50, a wireless intercom module 60, a time display module 70 and a power supply module 80.

Figure 5:
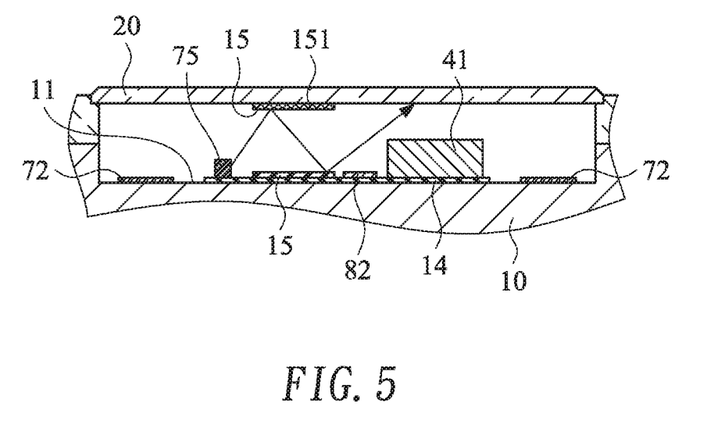
FIG. 5 is a schematic cross-sectional view illustrating a portion of the electronic watch according to the embodiment of the present invention.

The main body 10 comprises a displaying surface 11. A mesh 12 and a speaking start key 13 are formed on a lateral side of the main body 10. The control module 30, the positioning module 50, the wireless intercom module 60 and the power supply module 80 are disposed within the main body 10. The time display module 70 is installed on the displaying surface 11 of the main body 10 and electrically connected with the control module 30. The transparent cover 20 is aligned with the control module 30 to cover the displaying surface 11. Moreover, the transparent cover 20 is connected with the main body 10. A reflective glue 14 is coated on the displaying surface 11 of the main body 10. Moreover, the electronic watch 100 further comprises two reflective strips 15. The two reflective strips 15 are also shown in FIG. 5. The first reflective strip 15 is formed on the displaying surface 11 of the main body 10. The second reflective strip 15 is formed on a bottom surface of the transparent cover 20. Moreover, the first reflective strip 15 on the displaying surface 11 and the second reflective strip 15 on the transparent cover 20 face each other. Moreover, a mark 151 is formed on the second reflective strip 15. For example, the mark 151 is a logo mark, a brand pattern, a modeling image, or the like. Moreover, the transparent cover 20 is made of a glassy material.

The control module 30 comprises a circuit board 31, a control element 32 and a communication element 33. The control element 32 and the communication element 33 are installed on the circuit board 31 and electrically connected with the circuit board 31. The control element 32 is a controller or a microcontroller. The communication element 33 and the speaking start key 13 are electrically connected with the control element 32. The communication element 33 is a mobile communication element. While the communication element 33 is moved, the communication element 33 can still transmit or receive signals. In other words, the communication element 33 can transmit a distress signal 331.

The identifying module 40 is electrically connected with the control module 30. An example of the identifying module 40 is an optical fingerprint identification module. In an embodiment, the identifying module 40 comprises a fingerprint capturing element 41, a control unit 42 and a storage element 43. The fingerprint capturing element 41 is installed on the portion of the displaying surface 11 with the reflective glue 14 and aligned with the transparent cover 20. The fingerprint capturing element 41 is located under the transparent cover 20. The control unit 42 and the storage element 43 are installed on the circuit board 31 and electrically connected with the circuit board 31. Moreover, the control unit 42 is also electrically connected with the control element 32. The fingerprint capturing element 41 and the storage element 43 are electrically connected with the control unit 42. The fingerprint capturing element 41 is used for obtaining a capture signal 411. The storage element 43 stores an identification data 431. The identification data 431 contains a fingerprint data and a personal data of the user. For example, the fingerprint capturing element 41 is an optical fingerprint sensor, the control unit 42 is a microcontroller, and the storage element 43 is a memory.

The positioning module 50 is installed on the circuit board 31. Moreover, the positioning module 50 is electrically connected with the circuit board 31 and the control element 32. For example, the positioning module 50 is a satellite positioning module. According to a satellite signal, the positioning module 50 generates a position data 51 corresponding to the current position information.

When the capture signal 411 obtained by the fingerprint capturing element 41 and the identification data 431 stored in the storage element 43 comply with each other, the control element 32 combines the identification data 431 and the position data 51 as a distress signal 332. Moreover, the distress signal 332 is outputted from the control element 32.

The wireless intercom module 60 comprises a sound receiver 61, a sound output element 62, a first audio processor 63, a second audio processor 64 and an audio transceiver 65. The sound receiver 61, the sound output element 62, the first audio processor 63, the second audio processor 64 and the audio transceiver 65 are installed on the circuit board 31 and electrically connected with the circuit board 31. The sound receiver 61 is electrically connected with the speaking start key 13. The sound receiver 61 and the sound output element 62 are aligned with the mesh 12 of the main body 10. When the user speaks in the surroundings of the main body 10, the sound is introduced into the main body 10 through the mesh 12 and received by the sound receiver 61. After the sound is received by the sound receiver 61, an input audio signal 611 is generated. The sound output element 62 is capable of converting a return audio signal 621 into a sound, which is outputted to the surroundings of the main body 10 through the mesh 12 so as to be heard by the user. The first audio processor 63 is electrically connected with the sound receiver 61 and the audio transceiver 65. The second audio processor 64 is electrically connected with the sound output element 62 and the audio transceiver 65. The audio transceiver 65 is used for transmitting the input audio signal 611 and receives the return audio signal 621.

For example, the sound receiver 61 is a microphone, and the sound output element 62 is a speaker. The first audio processor 63 comprises an audio amplifier, a modulation circuit and a high frequency amplifier. The second audio processor 64 comprises a frequency selection amplifier, a mixed frequency amplifier, a medium frequency amplifier and a demodulation circuit. The audio transceiver 65 comprises a band pass filter and a filter.

When the speaking start key 13 is pressed, the sound receiver 61 is enabled to receive the sound in the surroundings of the electronic watch 61. After the sound is received by the sound receiver 61, the input audio signal 611 is generated. Then, the input audio signal 611 is processed by the first audio processor 63 through an audio amplifying operation, a modulating operation and/or a high frequency amplifying operation. After the input audio signal 611 is filtered by the audio transceiver 65, the input audio signal 611 is outputted through the antenna. Moreover, after the return audio signal 621 from a remote site is received by the antenna of the audio transceiver 65, the return audio signal 621 is filtered by the audio transceiver 65 and sent to the second audio processor 64. Then, the return audio signal 621 is processed by the second audio processor 64 through a frequency selection amplifying operation, a mixed frequency amplifying operation, a medium frequency amplifying operation and/or a demodulating operation. Then, the return audio signal 621 is converted into a sound and outputted to the surroundings.

The time display module 70 comprises a display control unit 71, plural first display units 72, plural second display units 73, a time adjuster 74, a noctilucent light generator 75 and a timing circuit 76. The display control unit 71 is installed on the circuit board 31 and electrically connected with the circuit board 31 and the control element 32. An example of the display control unit 71 is a microcontroller.

The plural first display units 72 and the plural second display units 73 are disposed on the displaying surface 11 of the main body 10. In this embodiment, the plural first display units 72 are disposed on the displaying surface 11 in a circular permutation, and the plural second display units 73 are externally arranged around the plural first display units 72 in a circular permutation. Moreover, the plural first display units 72 and the plural second display units 73 are in a concentric arrangement. The plural first display units 72 and the plural second display units 73 are electrically connected with the display control unit 71. In an embodiment, the plural first display units 72 and the plural second display units 73 are full-color light emitting diodes or monochromatic light emitting diodes. The monochromatic light emitting diodes are white light emitting diodes, red light emitting diodes, blue light emitting diodes, or the like. In an embodiment, the plural first display units 72 are numeric regions that are marked from the number 1 to the number 12, and the plural second display units 73 are coated with reflective glues 731. The first display units 72 are used for showing the time of the hour hand. The second display units 73 are used for showing the time of the minute hand.

The time adjuster 74 is formed on a lateral side of the main body 10 and electrically connected with the display control unit 71. The displayed time of the time display module 70 is adjusted through the time adjuster 74. The noctilucent light generator 75 is installed on the displaying surface 11 of the main body 10 and electrically connected with the circuit board 31 and the display control unit 71. In an embodiment, the noctilucent light generator 75 comprises a light emitting diode and an optical sensing unit. The light emitting diode is a white light emitting diode, a red light emitting diode, a blue light emitting diode or any other appropriate monochromatic light emitting diode. The optical sensing unit is an optical sensor. If the optical sensing unit senses that the intensity of the ambient light outside the electronic watch 100 is weak, the optical sensing unit issues a triggering signal to the display control unit 71. In response to the triggering signal, the display control unit 71 drives illumination of the monochromatic light emitting diode of the noctilucent light generator 75. Consequently, the electronic watch 100 can be used in a dark environment.

The timing circuit 76 is installed on the circuit board 31. Moreover, the timing circuit 76 is electrically connected with the circuit board 31 and the display control unit 71. In an embodiment, the timing circuit 76 comprises a quartz oscillator, a classification circuit, a counting circuit, a drive circuit, a boost filter circuit and a fine-tuning capacitor. The timing circuit 76 of the time display module 70 is used for calculating the current time and generating a time signal 761. Then, the time signal 761 is transmitted to the display control unit 71. The time signal 761 is shown through the first display units 72 and the second display units 73 under control of the display control unit 71.

The power supply module 80 comprises a power providing element 81 and a power generator 82. The power providing element 81 is installed on the circuit board 31. Moreover, the power providing element 81 is electrically connected with the circuit board 31, the control element 32, the identifying module 40, the positioning module 50, the wireless intercom module 60 and the time display module 70. For example, the power providing element 81 is a chargeable battery. The power generator 82 is disposed on the displaying surface 11 of the main body 10 and electrically connected with the power providing element 81. For example, the power generator 82 is a solar panel. When an ambient light from a light source is irradiated on the power generator 82, the ambient light is converted into electric energy by the power generator 82. An example of the light source includes but is not limited to the sun or a fluorescent lamp. The electric energy generated by the power generator 82 can be stored in the power providing element 81. Consequently, the power providing element 81 can provide sufficient electric energy to the control module 30, the identifying module 40, the positioning module 50, the wireless intercom module 60 and the time display module 70.

Figure 4:
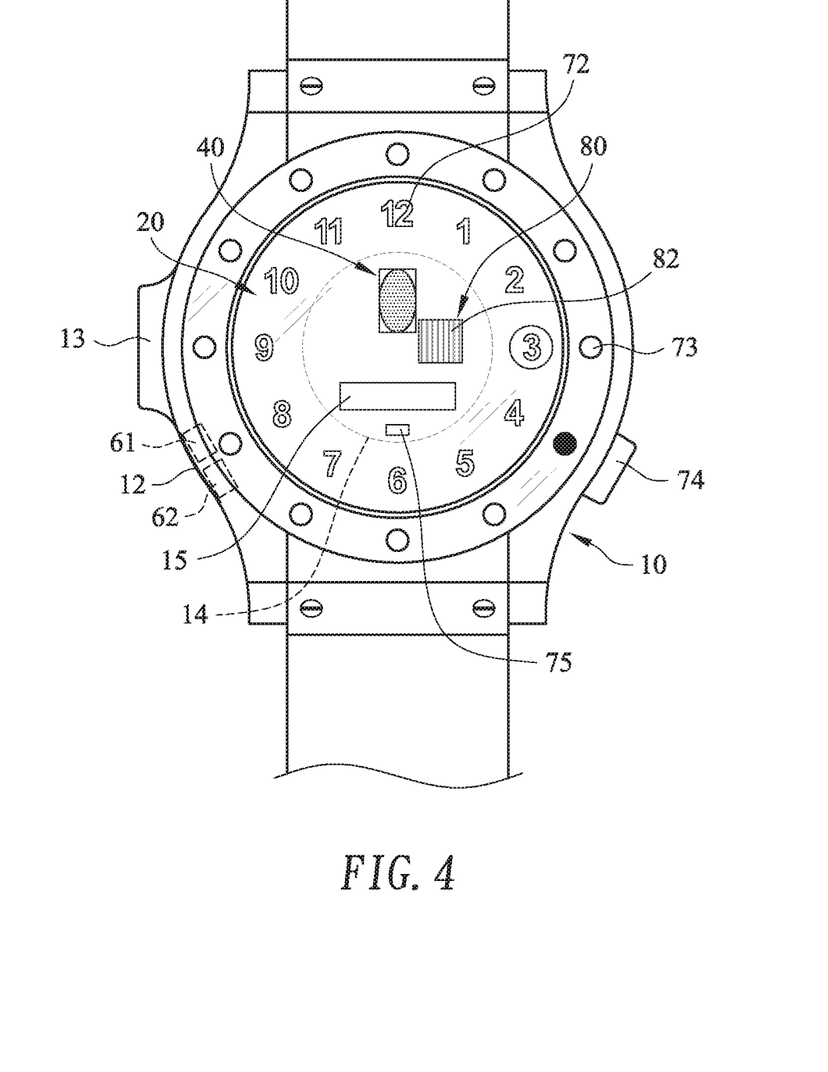
FIG. 4 schematically illustrates a usage scenario of the electronic watch according to the embodiment of the present invention.

FIG. 4 schematically illustrates a usage scenario of the electronic watch according to the embodiment of the present invention. When the user is in an emergency condition and needs to call for help, the user may place a finger on the transparent cover 20. Then, the fingerprint of the user's finger is captured by the fingerprint capturing element 41, and thus a capture signal 411 containing the fingerprint data of the user is generated. The capture signal 411 is transmitted to the control unit 42. Then, the control unit 42 receives the capture signal 411 and reads the identification data 431 from the storage element 43. Then, the control unit 42 compares the capture signal 411 with the fingerprint data of the identification data 431. When the capture signal 411 and the fingerprint data of the identification data 431 comply with each other, the identification data 431 is transmitted from the control unit 42 to the control element 32 of the control module 30. When the control element 32 receives the identification data 431, the control element 32 also reads the position data 51 from the positioning module 50. Then, the control element 32 combines the identification data 431 and the position data 51 as a distress signal 332. The distress signal 332 is converted into a distress signal 331 by the communication element 33 and the distress signal 331 is outputted. When the distress signal 331 is received by the emergency search and rescue center, the user can be searched and rescued according to the personal data of the distress signal 331 and the position data 51. Consequently, the efficacy of calling for help and accurately rescuing the user is enhanced, and the gold rescue time is not delayed.

The return audio signal 621 from the emergency search and rescue center is received by the audio transceiver 65. Then, the return audio signal 621 is processed by the second audio processor 64. Then, the return audio signal 621 is converted into a sound and outputted to the surroundings by the sound output element 62. When the user receives the sound from the emergency search and rescue center, the user may press the speaking start key 13 to enable the sound receiver 61 to receive the sound of the user. Then, the sound of the user is converted into an input audio signal 611. Then, the input audio signal 611 is processed by the first audio processor 63. Then, the input audio signal 611 is transmitted to the emergency search and rescue center through the audio transceiver 65. In other words, the user can communicate with the emergency search and rescue center. Consequently, the emergency search and rescue center can realize the current situation of the user.

Moreover, the electronic watch 100 has the function of displaying the time that is calculated by the timing circuit 76. Moreover, the time signal is shown through the first display units 72 and the second display units 73 under control of the display control unit 71. For example, in case that the current time is 3:20, the display control unit 71 controls the numeric region "3" of the first display units 72 to illuminate. Consequently, the time of the hour hand is shown through the corresponding first display unit 72. At the same time, the second display region 73 neighboring the numeric region "4" of the first display units 72 is illuminated under control of the display control unit 71. Consequently, the time of the minute hand is shown through the corresponding second display region 73. In other words, the current time can be viewed by the user. Moreover, the display control unit 71 may control the noctilucent light generator 75 to emit the light beam in the night. Consequently, the electronic watch 100 can be illuminated in the dark environment. In case that the light emitting diodes of the first display units 72 are full-color light emitting diodes, the numeric regions of the first display units 72 not related to the current time are illuminated with a first light color under control of the display control unit 71, and the numeric region of the first display unit 72 related to the current time is illuminated with a second light color under control of the display control unit 71. Consequently, the current time shown on the electronic watch 100 can be viewed in the dark environment more easily. Moreover, displayed time of the time display module 70 can be adjusted through the time adjuster 74. Consequently, the efficacy of correcting time is enhanced.

Moreover, when the ambient light from the sun or a fluorescent lamp is irradiated on the power generator 82, the ambient light is converted into electric energy by the power generator 82 and the electric energy is stored in the power providing element 81. The power providing element 81 provides electric energy for powering the electronic watch 100. Consequently, the solar powering efficacy is achieved. In other words, it is not necessary to change the battery of the electronic watch 100. Consequently, the power generation of the electronic watch 100 is achieved in an environmentally-friendly manner.

FIG. 5 is a schematic cross-sectional view illustrating a portion of the electronic watch according to the embodiment of the present invention. When the noctilucent light generator 75 emits a light beam, a portion of the light beam is irradiated on the second reflective strip 15, which is formed on the transparent cover 20. Since the mark 151 of the second reflective strip 15 is illuminated by the light beam from the noctilucent light generator 75, the mark 151 can be viewed in the dark environment.

Moreover, the light beam from the noctilucent light generator 75 is sequentially reflected by the reflective strips 15, the reflective glue 14 of the displaying surface 11 and the reflective glues 731 of the second display units 73. Consequently, the intensity of the light beam provided to the displaying surface 11 and the transparent cover 20 is sufficient. When the electronic watch 100 is used in the dark environment or the dim environment, the intensity of the light beam is sufficient for the user to view the displayed time of the electronic watch 100.

When the intensity of the ambient light is insufficient, the noctilucent light generator 75 emits a light beam. The light beam from the noctilucent light generator 75 is sequentially reflected by the reflective strips 15, the reflective glue 14 of the displaying surface 11 and the reflective glues 731 of the second display units 73. Consequently, the intensity of the light beam provided to the displaying surface 11 and the transparent cover 20 is sufficient. Under this circumstance, the intensity of the light beam is sufficient for the fingerprint capturing element 41 of the identifying module 40 to capture the fingerprint of the user's finger on the transparent cover 20. Consequently, the capture signal 411 containing the fingerprint data of the user can be successfully obtained by the fingerprint capturing element 41.

From the above descriptions, the present invention provides the electronic watch 100. The electronic watch 100 has many benefits. Firstly, the emergency search and rescue center can accurately realize the personal data and the position of the user through the control module 30, the identifying module 40 and the positioning module 50. Consequently, the efficacy of calling for help and accurately rescuing the user is enhanced, and the gold rescue time is not delayed. Secondly, the emergency search and rescue center can communicate with the user through the wireless intercom module 60. Consequently, the emergency search and rescue center can realize the current situation of the user and deal with the unexpected situation immediately. Thirdly, the first display units 72 and the second display units 73 can replace the hour hand and the minute hand of the conventional watch. Consequently, the current time can be viewed by the user more easily. Moreover, through the noctilucent light generator 75, the current time of the electronic watch 100 can be easily viewed by the user in the dark environment or the dim environment. Fourthly, since the power supply module 80 is equipped with the power generator 82, it is not necessary to change the battery of the electronic watch 100. Consequently, the power generation of the electronic watch 100 is achieved in an environmentally-friendly manner. Fifthly, the noctilucent light generator 75 emits a light beam when the electronic watch 100 is used in a dark environment. Consequently, the intensity of the light beam provided to the displaying surface 11 and the transparent cover 20 is sufficient. Under this circumstance, the capture signal 411 can be successfully obtained by the identifying module 40.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An electronic watch with a function of calling for help, the electronic watch comprising:
    a main body comprising a displaying surface;
    a control module disposed within the main body;
    a time display module disposed on the displaying surface and electrically connected with the control module;
    a transparent cover aligned with the control module to cover the displaying surface, wherein the transparent cover is connected with the main body;
    an identifying module connected with the displaying surface and located under the transparent cover, wherein the identifying module is electrically connected with the control module, and an identification data is stored in the identifying module; and
    a positioning module disposed within the main body and electrically connected with the control module, wherein the positioning module generates a position data,
    wherein if a capture signal obtained by the identifying module complies with the identification data, a distress signal containing the identification data and the position data is generated by the control module.

2. The electronic watch according to claim 1, wherein the control module comprises a control element and a communication element electrically connected with the control element, wherein the time display module, the identifying module and the positioning module are electrically connected with the control element, wherein after the identification data and the position data are converted into the distress signal by the control element, the distress signal is outputted through the communication element.

3. The electronic watch according to claim 2, wherein the control module further comprises a circuit board, wherein the control element, the communication element, the time display module, the identifying module and the positioning module are installed on the circuit board and electrically connected with the circuit board.

4. The electronic watch according to claim 3, wherein the positioning module is a satellite positioning module, and the positioning module receives a satellite signal and generates the position data according to the satellite signal.

5. The electronic watch according to claim 3, wherein the identifying module comprises a fingerprint capturing element and a control unit, wherein the fingerprint capturing element is installed on the displaying surface, the control unit is installed on the circuit board and electrically connected with the circuit board, the fingerprint capturing element and the control element are electrically connected with the control unit, and the capture signal is obtained by the fingerprint capturing element.

6. The electronic watch according to claim 5, wherein the identifying module further comprises a storage element, wherein the storage element is installed on the circuit board, the storage element is electrically connected with the control element and the circuit board, and the identification data is stored in the storage element.

7. The electronic watch according to claim 6, wherein the fingerprint capturing element is an optical fingerprint sensor, and the storage element is a memory.

8. The electronic watch according to claim 3, wherein the electronic watch further comprises a wireless intercom module, and the wireless intercom module is electrically connected with the circuit board, wherein a speaking start key is formed on a lateral side of the main body, and the speaking start key is electrically connected with the wireless intercom module, wherein the wireless intercom module is disposed within the main body, the wireless intercom module receives and transmits an input audio signal, and the wireless intercom module receives and outputs a return audio signal.

9. The electronic watch according to claim 8, wherein the wireless intercom module comprises a sound receiver and an audio transceiver, and the sound receiver and the audio transceiver are electrically connected with the circuit board, wherein the speaking start key is electrically connected with the sound receiver, and the sound receiver is electrically connected with the audio transceiver, wherein after the input audio signal is received by the sound receiver, the input audio signal is outputted through the audio transceiver.

10. The electronic watch according to claim 9, wherein the wireless intercom module further comprises a sound output element, and the sound output element is electrically connected with the audio transceiver and the circuit board, wherein after the return audio signal is received by the audio transceiver, the return audio signal is outputted through the sound output element.

11. The electronic watch according to claim 10, wherein the main body further comprises a mesh, and the sound receiver and the sound output element are aligned with the mesh.

12. The electronic watch according to claim 10, wherein the wireless intercom module further comprises a first audio processor and a second audio processor, wherein the sound receiver is electrically connected with the audio transceiver through the first audio processor, the sound output element is electrically connected with the audio transceiver through the second audio processor, the input audio signal is transmitted to the audio transceiver through the first audio processor, and the return audio signal is transmitted to the sound output element through the second audio processor.

13. The electronic watch according to claim 8, wherein the electronic watch further comprises a power supply module, and the power supply module comprises a power providing element, wherein the power providing element is installed on the circuit board, and the power providing element is electrically connected with the circuit board, the control element, the identifying module, the positioning module, the wireless intercom module and the time display module.

14. The electronic watch according to claim 13, wherein the power supply module further comprises a power generator, wherein the power generator is electrically connected with the power providing element and disposed on the displaying surface of the main body.

15. The electronic watch according to claim 14, wherein the power generator is a solar panel.

16. The electronic watch according to claim 3, wherein the time display module comprises a display control unit, plural first display units and plural second display units, wherein the display control unit is installed on the circuit board and electrically connected with the control element and the circuit board, and the plural first display units and the plural second display units are electrically connected with the display control unit and installed on the displaying surface.

17. The electronic watch according to claim 16, wherein the plural first display units are disposed on the displaying surface in a circular permutation, the plural second display units are externally arranged around the plural first display units in a circular permutation, and the plural first display units and the plural second display units are in a concentric arrangement.

18. The electronic watch according to claim 17, wherein the time display module further comprises a time adjuster, wherein the time adjuster is formed on a lateral side of the main body and electrically connected with the display control unit.

19. The electronic watch according to claim 16, wherein the time display module further comprises a timing circuit, wherein the timing circuit is installed on the circuit board, the timing circuit is electrically connected with the circuit board and the display control unit, the timing circuit generates a time signal, and the time signal is shown through the first display units and the second display units under control of the display control unit.

20. The electronic watch according to claim 16, wherein the time display module further comprises a noctilucent light generator, wherein the noctilucent light generator is installed on the displaying surface of the main body and electrically connected with the circuit board and the display control unit.

21. The electronic watch according to claim 20, wherein each of the plural first display units, the plural second display units and the noctilucent light generator comprises a light emitting diode, and the display control unit is a microcontroller.

22. The electronic watch according to claim 20, wherein each of the displaying surface and the plural second display units is coated with a reflective glue.

23. The electronic watch according to claim 22, wherein the electronic watch further comprises a first reflective strip and a second reflective strip, wherein the first reflective strip is disposed on the displaying surface of the main body, the second reflective strip is disposed on a bottom surface of the transparent cover, and the first reflective strip and the second reflective strip face each other.

24. The electronic watch according to claim 23, wherein a mark is formed on the second reflective strip, which is disposed on the transparent cover.

25. The electronic watch according to claim 1, wherein the transparent cover is made of a glassy material.

* * * * *